United States Patent
Tian

(10) Patent No.: US 11,623,384 B2
(45) Date of Patent: Apr. 11, 2023

(54) RUBBER SOLE THERMOFORMING MACHINE

(71) Applicant: DAH TYAN HYDRAULIC MACHINE INDUSTRIAL CO., LTD., Taichung (TW)

(72) Inventor: Wen-Sen Tian, Taichung (TW)

(73) Assignee: DAH TYAN HYDRAULIC MACHINE INDUSTRIAL CO., LTD., Taichung (TW)

(*) Notice: Subject to any disclaimer, the term of this patent is extended or adjusted under 35 U.S.C. 154(b) by 0 days.

(21) Appl. No.: 17/115,276

(22) Filed: Dec. 8, 2020

(65) Prior Publication Data

US 2021/0178655 A1 Jun. 17, 2021

(30) Foreign Application Priority Data

Dec. 11, 2019 (TW) ................................ 108145224

(51) Int. Cl.
| | | |
|---|---|---|
| *B29C 51/38* | (2006.01) | |
| *A43D 35/00* | (2006.01) | |
| *B29C 51/10* | (2006.01) | |
| *B29K 21/00* | (2006.01) | |
| *B29L 31/50* | (2006.01) | |

(52) U.S. Cl.
CPC .............. *B29C 51/38* (2013.01); *A43D 35/00* (2013.01); *B29C 51/10* (2013.01); *B29K 2021/00* (2013.01); *B29L 2031/504* (2013.01)

(58) Field of Classification Search
CPC ......... B29C 51/38; B29C 51/10; B29C 51/20; B29C 35/02; B29C 51/08; A43D 35/00; B29K 2021/00; B29L 2031/504; F16M 11/08
See application file for complete search history.

(56) References Cited

U.S. PATENT DOCUMENTS

| 4,105,736 A | * | 8/1978 | Padovani | ................ B29C 51/00 |
| | | | | 264/153 |
| 2018/0126608 A1 | * | 5/2018 | Hsieh | ....................... B29C 33/02 |
| 2019/0084214 A1 | * | 3/2019 | Drexler | ............... B29C 63/0065 |

FOREIGN PATENT DOCUMENTS

| CN | 207034548 | * | 2/2018 | ............. F16M 11/08 |
| TW | M582894 U | * | 9/2019 | ............. B29C 35/02 |

\* cited by examiner

*Primary Examiner* — Galen H Hauth
*Assistant Examiner* — Shibin Liang
(74) *Attorney, Agent, or Firm* — Muncy, Geissler, Olds & Lowe, P.C.

(57) ABSTRACT

A rubber sole thermo-molding machine includes a lower mold seat disposed on a hydraulic actuator of the machine seat. The lower mold seat ascends and descends with respect to the upper mold seat according to the hydraulic actuator, allowing the lower upper molds to close and open. The upper mold seat moves between a normal position and a tilt position according to the turning mechanism. The middle plate horizontally moves between the upper and the lower mold seats, and has a push mechanism connected with the middle frame. When the pin of the middle frame and the fasten unit on the push mechanism are separated, the middle frame is stacked on the middle plate or the lower mold to move, facilitating the cleansing and material-feeding operations. The user can cleanse the upper mold without being hindered by the middle frame, assuring the safe and smooth process.

8 Claims, 11 Drawing Sheets

RUBBER SOLE THERMOFORMING MACHINE

BACKGROUND OF THE INVENTION

1. Field of the Invention

The present invention relates to thermo-molding machine, and more particularly, to a thermo-molding machine whose middle frame is separable with the pushing mechanism thereof.

2. Description of the Related Art

Referring to FIG. 1, a conventional rubber sole thermo-molding machine is disclosed, comprising a lower mold seat 1, a middle plate 2, an upper mold seat 3, a middle frame 4, and a vacuum cover 5. The lower mold seat 1 is controlled by a hydraulic actuator 6 to ascend and descend. The upper mold seat 3 is controllable for turning. The middle plate 2 is disposed between the lower mold seat 1 and the upper mold seat 3 and allowed to horizontally move. Therein, the middle frame 4 is disposed on the upper mold seat 3, so as to be pushed and controlled to ascend and descend between the lower mold seat 1 and the upper mold seat 3. The middle frame 4 is able to ascend and turned through the push mechanism 7, and then covered by the vacuum cover 5, thereby facilitating the thermo-molding operation which comprises thermo-molding and vacuuming steps.

During the thermo-molding operation above, before the lower mold 8 and the upper mold 9 carrying out the hot pressing process, of the thermo-molding operation, the push mechanism 7 drives the middle frame 4 to move onto the middle plate 2 to be stacked thereon, so as to form a cavity for material feeding therein. However, the middle frame 4 and the push mechanism 7 connected to the middle frame 4 are only allowed to be relatively move instead of separating from each other, so that when the middle frame 4 is driven to descend, the push mechanism 7 causes an obstacle hindering the cleansing or material feeding operation of the user. Also, due to a relatively narrow operation space, the user is often accidentally burnt by the high temperature of the lower mold 8 or the upper mold 9. Further, in an inappropriate operation case, hands of the user are possibly clamped and injured between the lower mold 8 and the upper mold 9. Additionally, the cleansing operation of the upper mold 9 is possible blocked by the middle frame 4. Therefore, it is desirable for the industry to resolve the inconvenience and potential risks of thermo-molding operation aforementioned.

SUMMARY OF THE INVENTION

To improve the issues above, a rubber sold thermo-molding machine is disclosed. When the middle frame moves toward the lower mold seat to be stacked on the middle plate, the push mechanism is separable with the middle frame, so that the lower mold and the middle plate and the middle framed stacked thereon can be pushed out toward the user, facilitating the cleansing or material feeding operations. Also, the upper mold is able to tilt when the middle frame is displaced, enabling the cleansing operation of the upper mold.

A rubber sold thermo-molding machine in accordance with an embodiment of the present invention is provided, comprising a machine seat, a lower mold seat, an upper mold seat, a middle plate, a middle frame, and a push mechanism. The machine seat is provided with a hydraulic actuator. The lower mold seat is disposed on the hydraulic actuator, so that a lower mold is disposed on the lower mold seat. The lower sold seat is connected with a first horizontal movement mechanism. The first horizontal movement mechanism controls the lower mold seat to horizontally move between a lower mold closing position, which is on a rear side, and a lower mold forward-moving position, which is on a front side. The upper mold seat is disposed on the machine seat and arranged above the lower mold seat, so that an upper mold is disposed on the upper mold seat. The upper mold seat is connected with a turning mechanism disposed on the machine seat. The turning mechanism drives the upper mold seat to move between a normal position and a tilt position. When the upper mold seat is at the normal position, the lower mold seat can operated with the hydraulic actuator, so as to drive the lower mold to ascend or descend to achieve a mold closing or mold opening process. The middle plate is disposed between the lower mold seat and the upper mold seat, and connected with a second horizontal movement mechanism. The second horizontal movement mechanism controls the middle plate to move between a middle plate backward-moving position, which is on a rear side, and a middle plate closing position, which is on a front side. The middle plate, which is at the middle plate closing position, is arranged in alignment with the upper mold seat, which is at the normal position, and the lower mold seat, which is at the lower mold closing position, between the upper mold seat and the lower mold seat. The middle frame comprises a position pin. The push mechanism is disposed on the upper mold seat. The push mechanism comprises a fasten unit having a plurality of beads. The fasten unit controls the plurality of beads to be engaged with the position pin, such that the middle frame moves approaching or away from the upper mold seat along with the operation of the push mechanism. The fasten unit controls the plurality of beads to leave the position pin, so that the fasten unit is separated from the middle frame along with the operation of the push mechanism.

With such configuration, before the lower mold, the middle plate, the middle frame, and the upper mold carrying out the hot pressing process of the thermo-molding operation, the push mechanism can be separated from the middle frame, with the middle frame stacked on the middle plate and the lower mold, so as to be pushed out along with the lower mold seat toward the user. Therefore, the user is allowed to carry out the cleansing or material feeding operation in the cavity formed by the middle plate and the middle frame. In other words, the push mechanism will not occupy the space to become an operation obstacle. Also, when the push mechanism is separated with the middle frame, the upper mold can move to the tilt position for not being blocked by the middle frame, facilitating the cleansing operation. Therefore, the thermo-molding process is more efficient, and the user is prevented from being burnt or clamped.

DETAILED DESCRIPTION OF THE INVENTION

Figure 1:
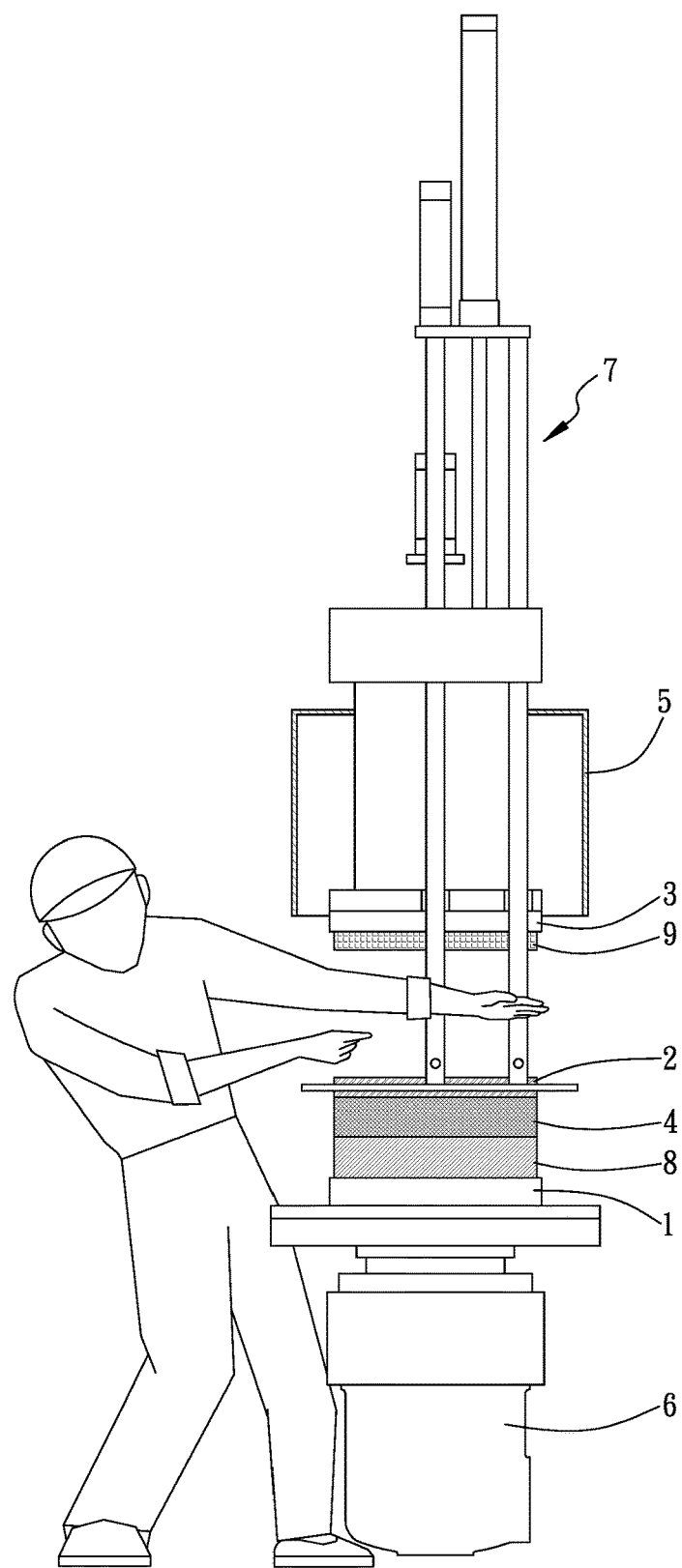
FIG. 1 is a schematic side view of a conventional rubber sole thermo-molding machine, whose middle frame and the middle plate are stacked on the lower mold, so that the user needs to operate in a narrow space due to the block of the push mechanism.
Figure 2:
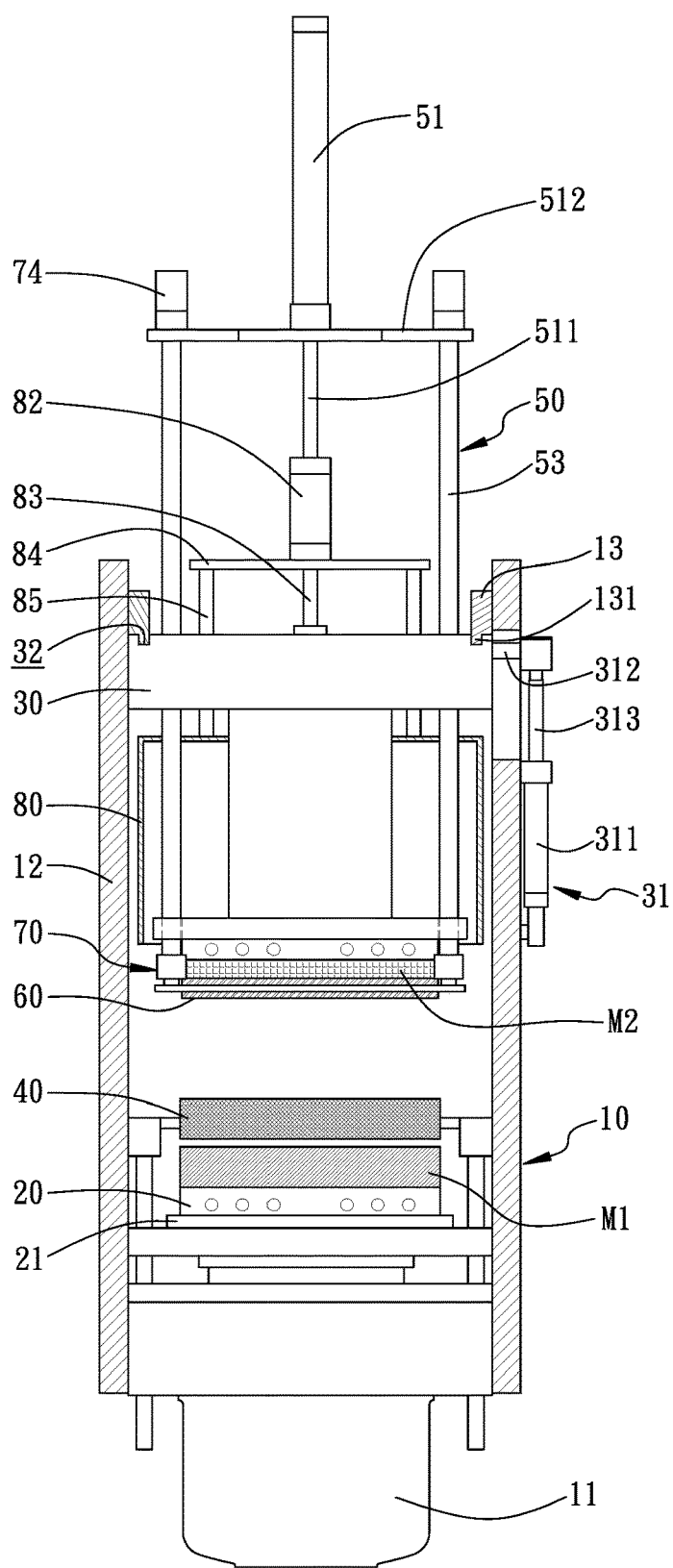
FIG. 2 is a schematic front view of the rubber sole thermo-molding machine in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 2 to FIG. 10, a rubber sole thermo-molding machine 100 is provided, comprising a machine seat 10, a lower mold seat 20, an upper mold seat 30, a middle plate 40, a push mechanism 50, and a middle frame 60.

The machine seat 10 comprises a hydraulic actuator 11, which is a hydraulic cylinder in the embodiment. In the embodiment, the machine seat 10 comprises two side plates 12 disposed on two opposite sides of the machine seat 10. The lower mold seat 20 is disposed on the hydraulic actuator 11, so that a lower mold M1 is disposed on the lower mold seat 20. The upper mold seat 30 is disposed between two side plates 12 and arranged on an upper side above the lower mold seat 20. An upper mold M2 is disposed on the upper mold seat 30. The lower mold seat 20 moves along with the operation of the hydraulic actuator 11, so that when the lower mold seat 20 ascends, the lower mold M1 and the upper mold M2 achieve a mold closing status, and when the lower mold seat 20 descends, the lower mold M1 and the upper mold M2 achieve a mold opening status. In the embodiment, the lower mold M1 and the upper mold M2 are exemplified with a mold for manufacturing the rubber sole (not shown) of a shoe. The lower mold seat 20 is connected with a first horizontal mechanism 21. The first horizontal mechanism 21 controls the lower mold seat 20 to horizontally move between a lower mold closing position and a lower mold forward-moving position. The lower mold closing position is on a relatively backward position and right above the hydraulic actuator 11, and the lower mold forward-moving position is on a relatively forward position and in front of the hydraulic actuator 11.

In the embodiment, the upper mold seat 30 is pivotally disposed on the top portion of the two side plates 12 and able to be reversely turned. The upper mold seat 30 is connected with a turning mechanism 31, which is disposed on the machine seat 10 and applied for lifting the upper mold seat 30. The upper mold seat 30 is driven to move between a normal position and a tilt position along with the operation of the turning mechanism 31. In the embodiment, the turning mechanism 31 comprises a lift cylinder 311 and a shaft coupling member 312. The shaft coupling member 312 is disposed on one side of the upper mold seat 30 at a position different from the position of the pivotal connection between the upper mold seat 30 and the machine seat 10.

The lift cylinder 311 comprises an operation rod 313 which is stretchable on one end of the lift cylinder 311. The operation rod 313 is pivotally connected with the shaft coupling member 312 by the end of which stretches out of the lift cylinder 311, that the lift cylinder 311 drives the operation rod 313 to stretch and retract for controlling the upper mold seat 30 to move between the normal position and the tilt position. Therein, the normal position is the position at which the lower mold seat 20 ascends for the lower mold M1 and the upper mold M2 to combine for achieving the mold closing status. When the lower mold M1 and the upper mold M2 are combined and then the thermo-molding process is completed, the upper mold seat 30 moves from the normal position to the tilt position, so that the user is able to take out the rubber sole product.

Figure 3:
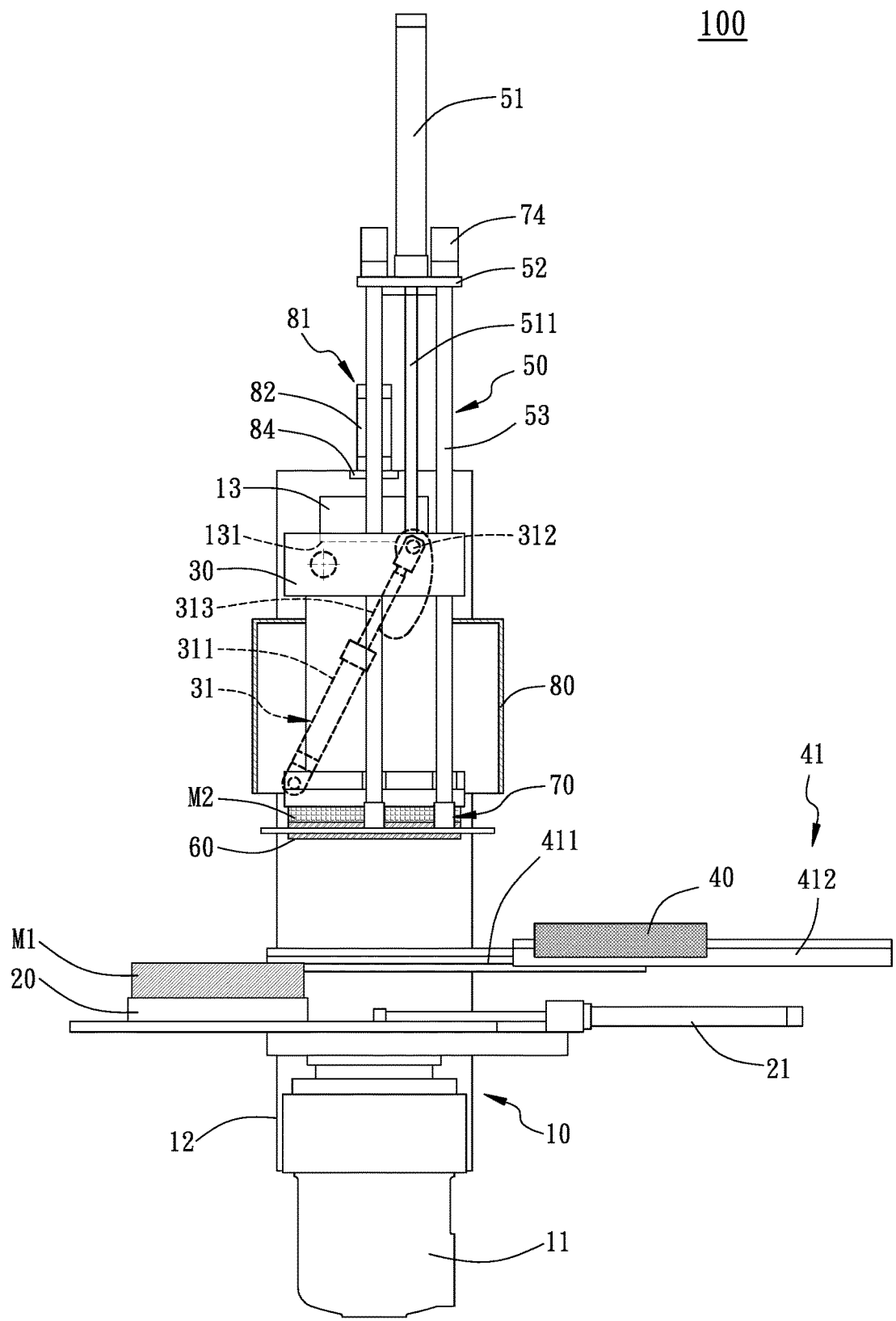
FIG. 3 is a schematic side view of the rubber sole thermo-molding machine in accordance with an embodiment of the present invention.
Figure 4:
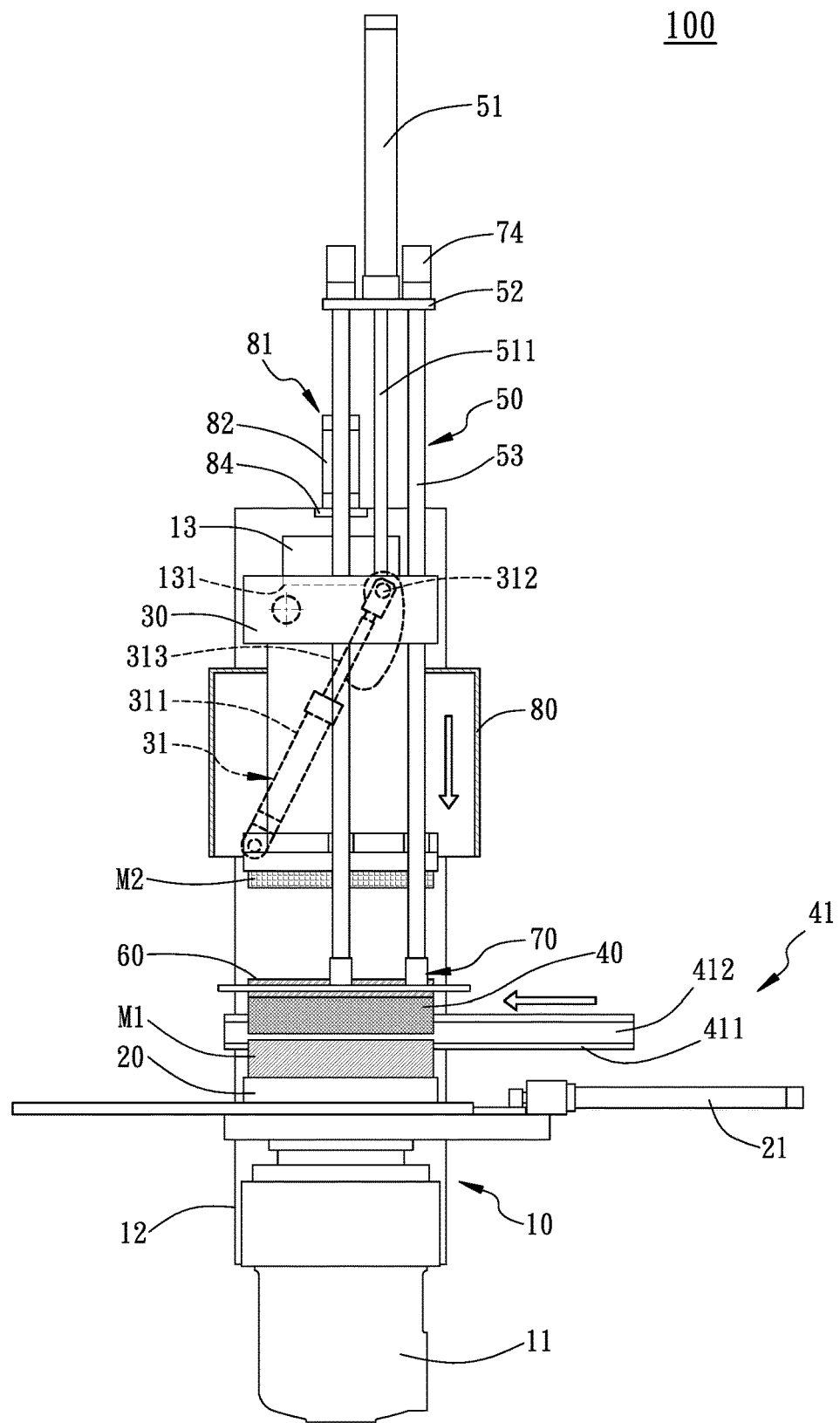
FIG. 4 is a schematic view illustrating the middle plate in FIG. 3 stacked on the lower mold, with the middle frame descending to be stacked on the middle plate.
Figure 5:
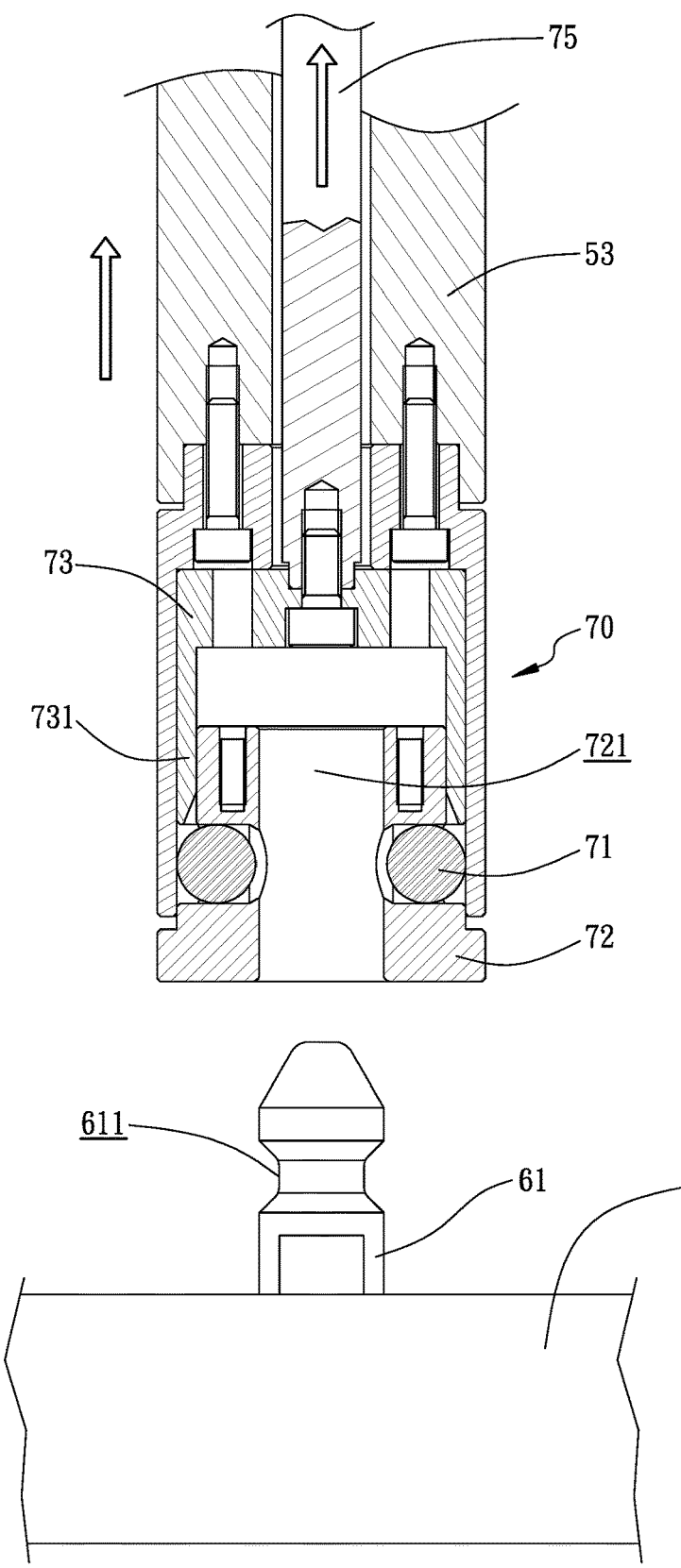
FIG. 5 is a schematic view illustrating that, after the status in FIG. 4, the fasten unit
Figure 6:
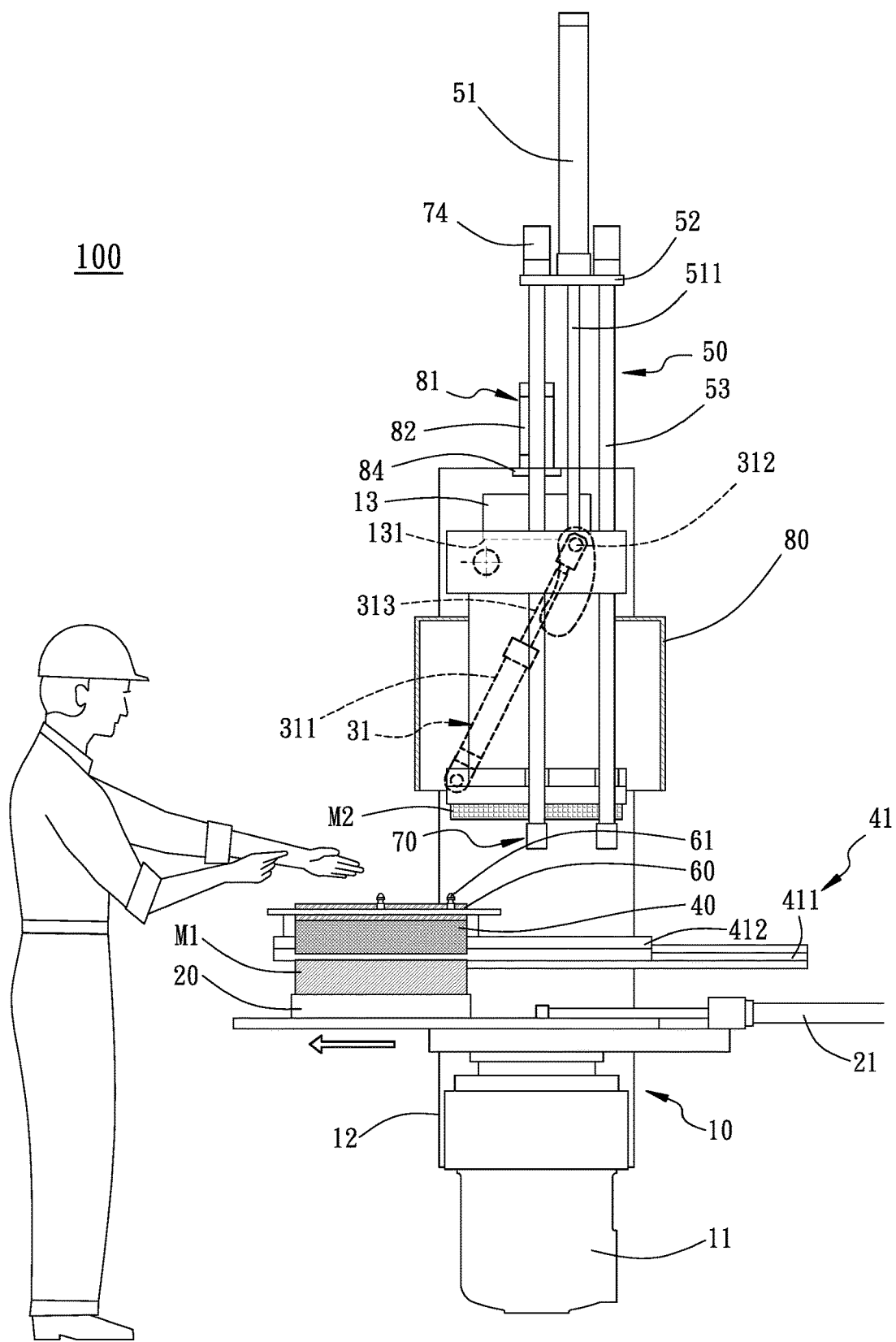
FIG. 6 is a schematic view illustrating, from FIG. 4, the lower mold seat at the lower mold forward-moving position and the upper mold seat at the normal position, wherein the user carried out the cleansing and the material feeding operation for the mold.
Figure 7:
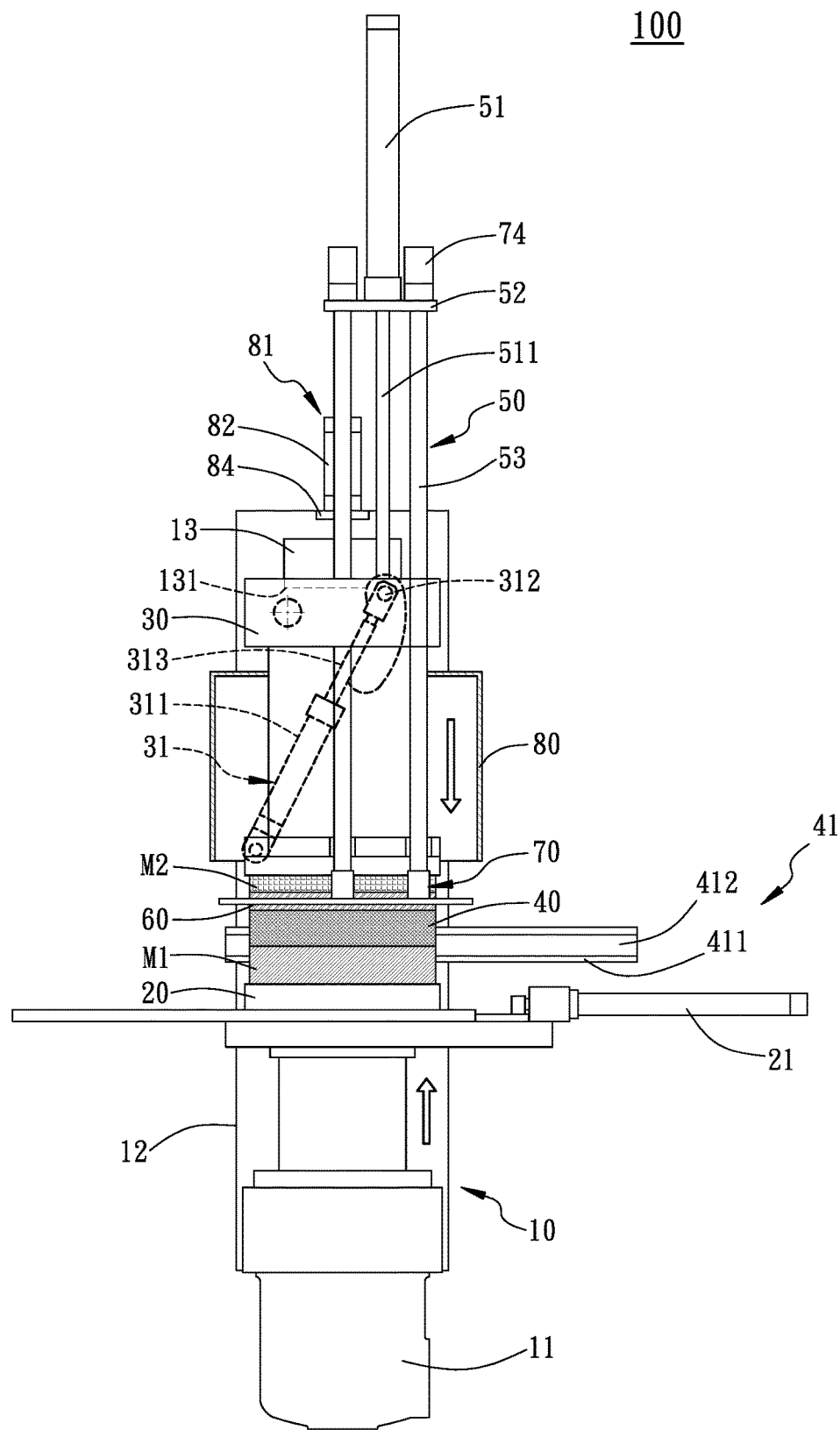
FIG. 7 is a schematic view illustrating, from FIG. 6, the lower mold seat moving back to the lower mold closing position, with the hydraulic actuator operating to close the mold, and the vacuum cover descending to the closing position for vacuuming after the mold closing.
Figure 8:
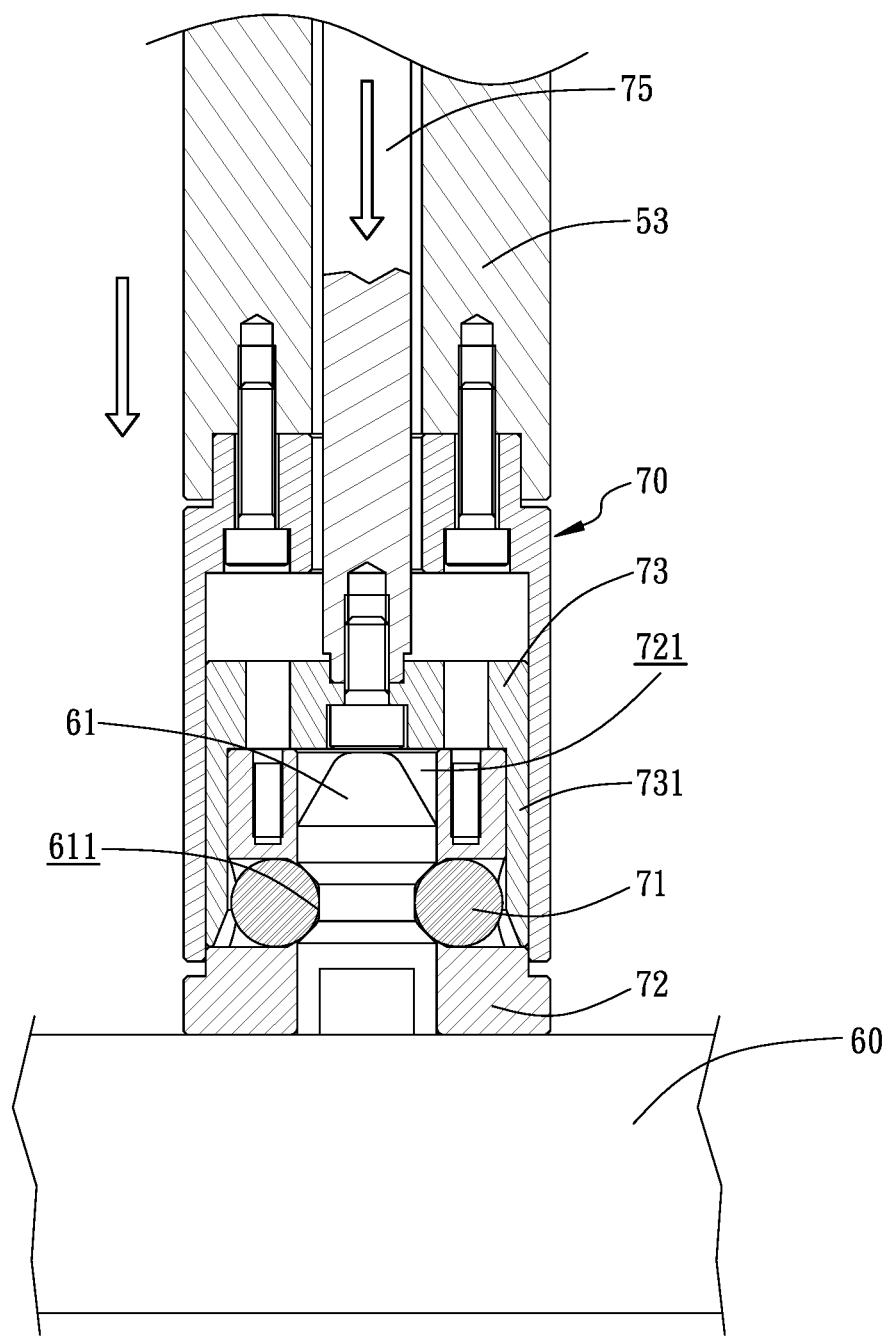
FIG. 8 is a schematic view illustrating, from FIG. 7, the fasten unit being combined with the position pin along with the mold closing movement.
Figure 9:
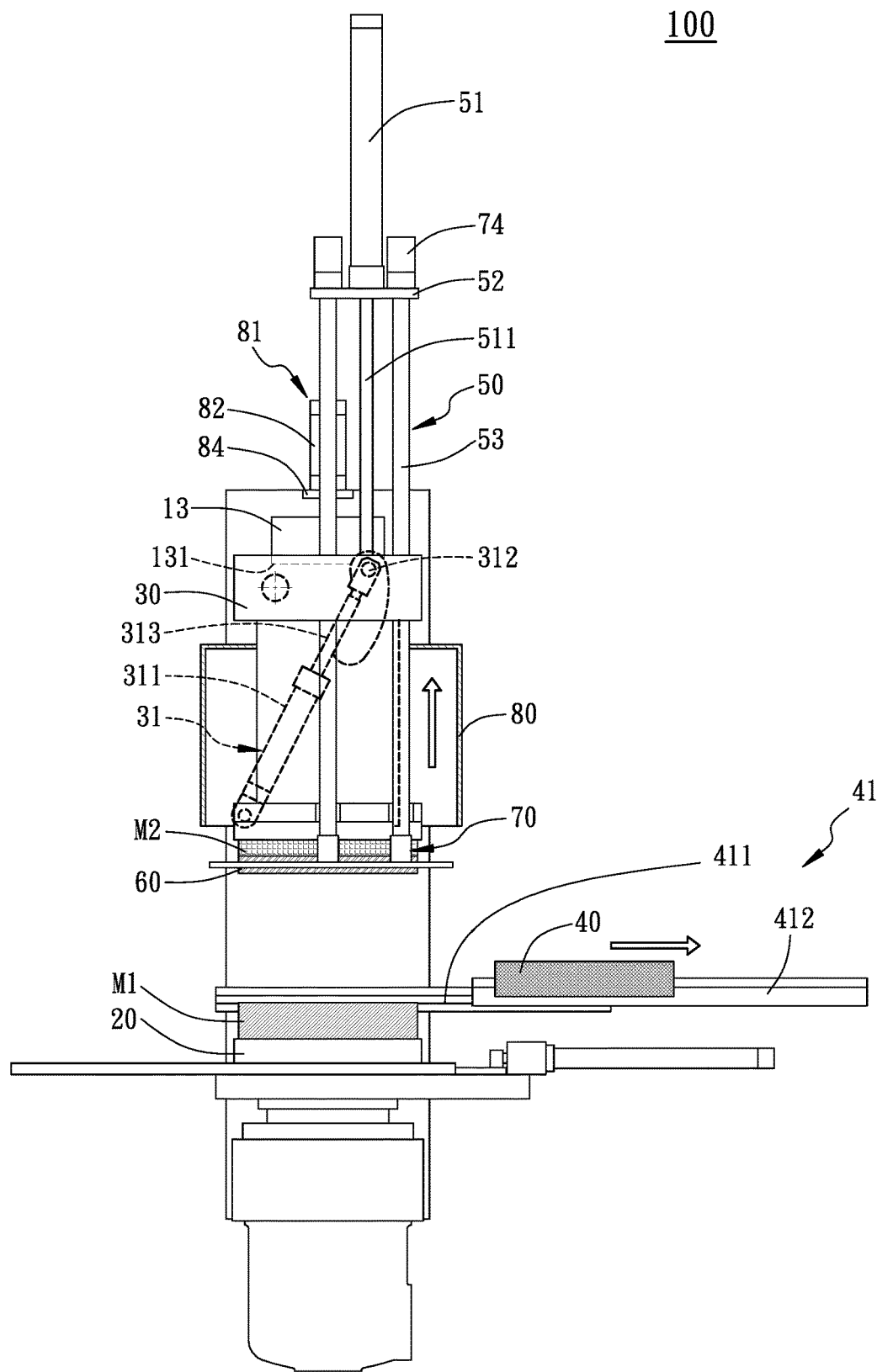
FIG. 9 is a schematic view illustrating, from FIG. 7, the lower mold seat descending to open the mold and the middle plate moving to the middle plate backward-moving position, wherein the vacuum cover ascends to the open position after molding opening process for vacuum relief.
Figure 10:
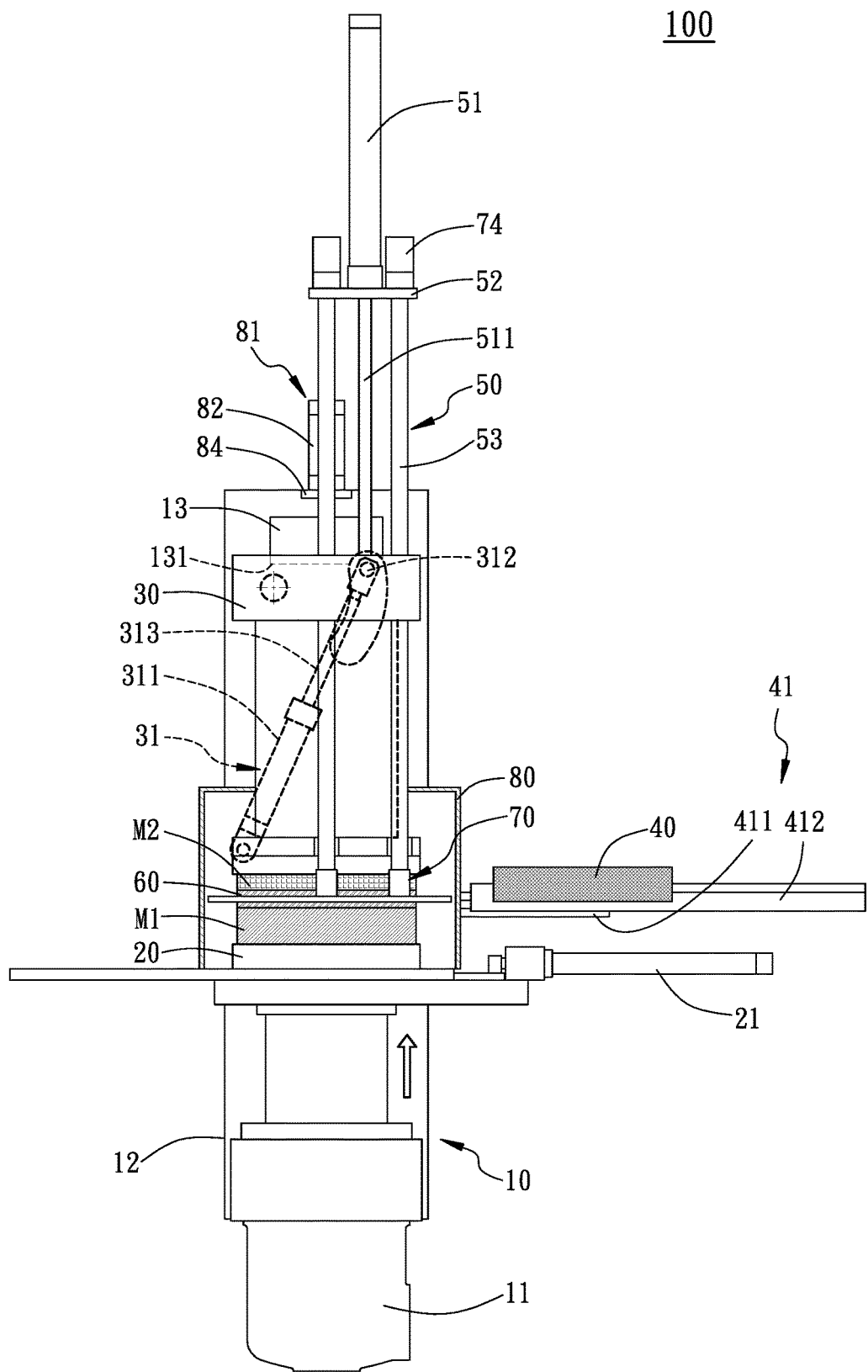
FIG. 10 is a schematic view illustrating, from FIG. 9, the hydraulic actuator driving the upper mold seat to ascend for close the mold, wherein the vacuum cover descends to the close position again for vacuuming after the mold closing process.
Figure 11:
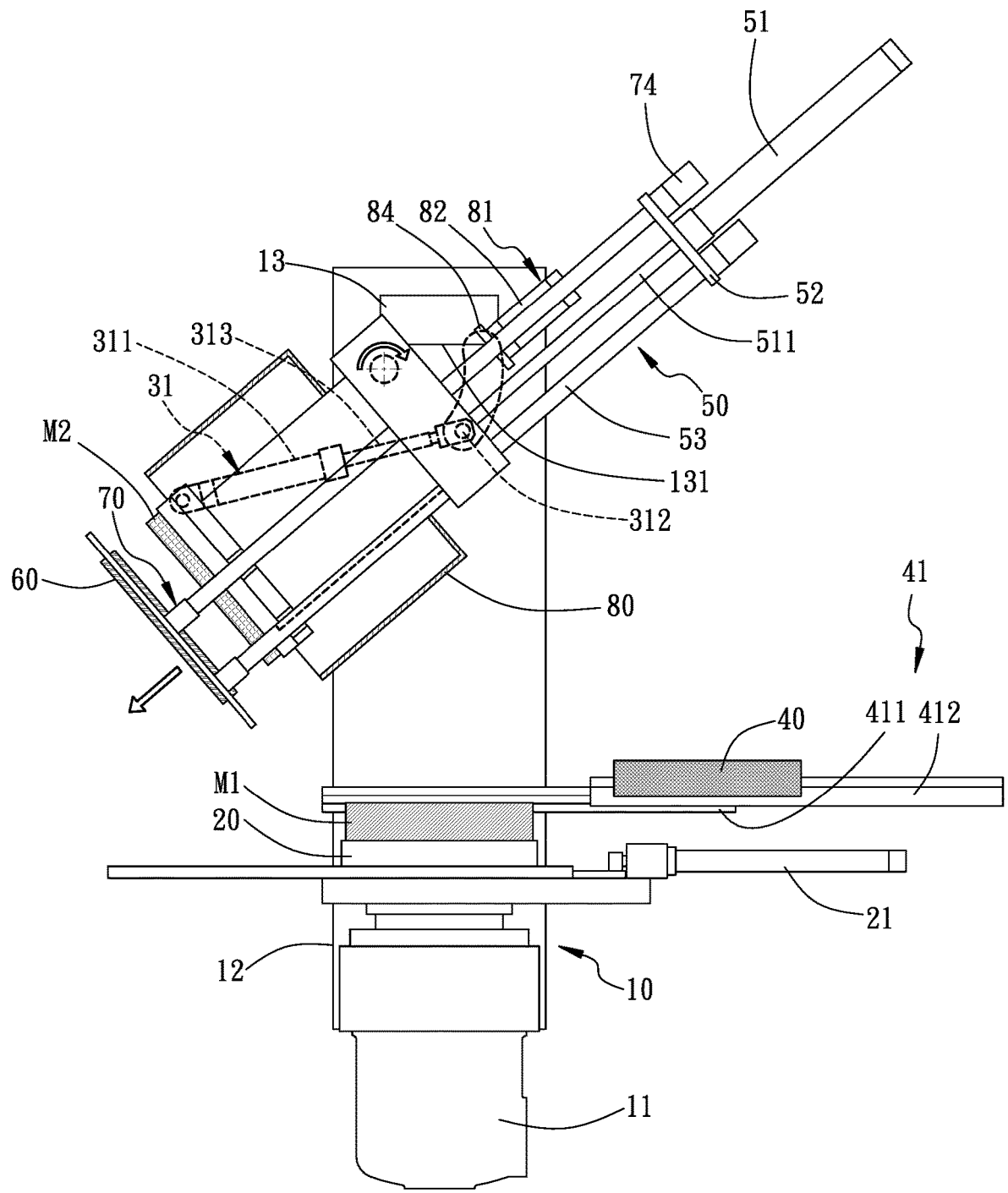
FIG. 11 is a schematic view illustrating, from FIG. 10, the hydraulic actuator driving the upper mold seat to descend for opening the mold, wherein the upper mold is at the tilt position, and the middle frame is driven by the push mechanism to extend, allowing the user to take out the finished rubber sole.

The middle plate 40 is disposed between the lower mold seat 20 and the upper mold seat 30, and connected with a second horizontal movement mechanism 41. The second horizontal movement mechanism 41 controls the middle plate 40 to horizontally move among a middle plate backward-moving position (as shown by FIG. 3) which is defined on a relatively backward side, a middle plate closing position (as shown by FIG. 4) which is defined on a relatively intermediate side, and a middle plate forward-moving position (as shown by FIG. 6) which is defined on a relatively forward side. When the middle plate 40 is at the middle plate closing position, the upper mold seat 30 is at the normal position, and the lower mold seat 20 is at the lower mold closing position, the middle plate 30 is arranged in direct alignment between the upper mold seat 30 and the lower mold seat 20. In the embodiment, the second horizontal movement mechanism 41 comprises a rail 411 and a slide seat 412, and the middle plate 40 is disposed on the slide seat 412, so as to horizontally move among the middle plate backward-moving position, the middle plate closing position, and the middle plate forward-moving position.

The push mechanism 50 is disposed on the upper mold seat 30. When the upper mold seat 30 is between the normal position and the tilt position, the push mechanism 50 tilts with the upper mold seat 30. The push mechanism 50 is provided with a fasten unit 70 corresponding to the middle frame 60. The middle frame 60 comprises a position pin 61, and the fasten unit 70 comprises a plurality of beads 71. The fasten unit 70 controls the beads 71 to be engaged with the position pin 61, such that the middle frame 60 moves toward or away from the upper mold seat 30 along with the operation of the push mechanism 50. Also, the fasten unit 70 controls the beads 71 to leave the position pin 61, so that the fasten unit 70 is able to be separated with the middle frame 60 along with the operation of the push mechanism 50.

In the embodiment, the position pin 61 comprises a recess portion 611. The fasten unit 70 comprises a seat body 72 and a sleeve member 73. The seat body 72 has a pin bore 721. The plurality of beads 71 are disposed on the seat body 72, and arranged, in the embodiment, in a ring shape arrangement. The beads 71 are able to transversely move with respect to the pin bore 721. The sleeve member 73 has a peripheral wall 731 connected with the peripheral side of the seat body 72. The seat body 72 is engaged with the corresponding position pin 61 with the pin bore 721, and drives the sleeve member 73 to abut against the plurality of beads 71 with the peripheral wall 731, such that the beads 71 are abutted by the peripheral wall 731 to laterally move inward, so that the beads 71 enter the recess portion 611 for engaging the position pin 61. Also, the fasten unit 71 is able to drive the sleeve member 73 for retreating the peripheral wall 731, during which the beads 71 are not abutted by the peripheral wall 731 and allowed to laterally move outward, so that the bead 71 are not abutted in the recess portion 611 and separated from the position pin 61.

In the embodiment, the push mechanism 50 comprises a push cylinder 51. The push cylinder 51 has a drive shaft 511 which is stretching on one end of the push cylinder 51. The drive shaft 511 has one end, which stretches out of the push cylinder 51, combined on the upper mold seat 30. The push cylinder 51 has a combination plate 52 disposed on one end at which the stretchable drive shaft 511 is disposed. The push mechanism 50 comprises a plurality of tube members 53. The plurality of tube member 53 are able to longitudinally movably pass through the upper mold seat 30. In the embodiment, the plurality of tube members 53 are disposed on the combination plate 52, and move with respect to the upper mold seat 30 along with the stretching and retracting movement of the drive shaft 511. Therefore, when the drive shaft 511 retracts back into the push cylinder 51, the tube members 53 stretch toward the lower mold seat 20; meanwhile, the middle frame 60 moves away with respect to the upper mold seat 30. In contrast, when the drive shaft 511 stretches out of the push cylinder 51, the tube members 53 move back to the upper mold seat 30; meanwhile, the middle frame 60 moves toward the upper mold seat 30.

Each of the tube members 53 in the embodiment is provided with the fasten unit 70. Each fasten unit 70 further comprises a control member 74 and a movement rod 75. The control member 74 is disposed on the top end of the tube member 53, and the movement rod 75 movably passes through the corresponding tube member 53. Also, the top end of the movement rod 75 is connected with the control member 74. The seat body 72 is disposed on the bottom end of the corresponding tube member 53. The sleeve member 73 is connected with the bottom end of the corresponding movement rod 75. The movement rod 75 is able to be controlled by the control member 74 to move in the corresponding tube member 53. The seat body 72 longitudinally moves with the corresponding tube member 53 to be engaged with the corresponding position pin 61 through the pin bore 721. Also, the seat body 72 axially moves with the movement rod 75 to drive the sleeve member 73 to abut against the beads 71 in the recess portion 611 with the peripheral wall 731, or axially moves with the movement rod 75 to retreat the peripheral wall 731 of the sleeve member 73 from abutting against the beads 71 in the recess portion 611.

In the embodiment, each of the two side plates 12 comprises a block body 13, while two block bodies 13 are disposed on two opposite sides. Each block body 13 has a first block portion on one side, and a second block portion is disposed on one side of the upper mold seat 30 corresponding to the first block portion. In the embodiment, the first block portion is a flange 131 disposed on the bottom portion of the block body 13, and the second block portion is a groove 32 disposed on the upper mold seat 30 corresponding to the flange 131. When the upper mold seat 30 is at the normal position, the first block portion is engaged with the second block portion. In other words, the flange 131 is received in the corresponding groove 32. When the lower mold seat 20 ascends to be combined with the upper mold seat 30 and pressured for lifting, two side plates 12 are restrained by each block body 13, so that the distance between the two side plates 12 remains fixed instead of expanding.

In the embodiment, a vacuum cover 80 is further included. The vacuum cover 80 is movably disposed on the upper mold seat 30. Also, the vacuum cover 80 is driven by a vacuum cover control mechanism 81 to ascend and descend between a closing position, which is relatively lower, and an opening position, which is relative higher. Preferably, the vacuum cover control mechanism 81 in the embodiment comprises an elevation cylinder 82. The elevation cylinder 82 comprises a valve rod 83 connected with the upper mold seat 30. The elevation cylinder 82 has a linkage plate 84 fixed thereon, with two ends of the linkage plate 84 connected with the vacuum cover 80 through a connection rod 85, respectively. With the elevation cylinder 82 controlling the valve rod 83 to stretch and retract, the linkage plate 84 drives the vacuum cover 80 to ascend and descend through the connection rod 85. When the hot press mold is in the mold closing status, the vacuum cover 80 covers the lower mold M1, the middle plate 40, the middle frame 60, and the upper mold M2, and carries out the vacuuming operation, whereby a negative pressure status is presented in the vacuum cover 80, facilitating the solidness and the stableness of the product during the thermo-molding process.

During operation, the first horizontal movement mechanism 21 moves the lower mold seat 20 forward, and the lower mold M1 is located at the lower mold forward-moving position. The user is able to cleanse the lower mold M1 and then put the material therein. Then, the first horizontal movement mechanism 21 moves the lower mold seat 20 backward, so that the lower mold M1 is located at the lower mold closing position. At the meantime, the second horizontal movement mechanism 41 moves the middle plate 40 forward to the middle plate closing position, so that the middle plate 40 is in direct alignment with the lower mold M1 beneath. Then, the push mechanism 50 drives the middle frame 60 away from the upper mold seat 30 to be stacked upon the middle plate 40. The fasten unit 70 drives the peripheral wall 731 of the sleeve member 73 to retreat from abutting against the beads 71 in the recess portion 611 and to leave the position pin 61. Then, the first horizontal movement mechanism 21 moves the lower mold seat 20 forward for the middle plate 40 and the middle frame 60 to be stacked on the lower mold M1. As shown by FIG. 6, the lower mold seat 20 moves forward to be located at the lower mold forward-moving position, and the user is able to cleanse the cavity (not shown) formed by the middle plate 40 and the middle frame 60 and put the material therein. Meanwhile, the upper mold seat 30 is able to be moved to the normal position when the middle frame is displaced, facilitating the cleansing operation of the upper mold M2.

When the lower mold M1 and the cavity formed by the middle plate 40 and the middle frame 60 are fed with material, the lower mold M1 and the middle plate 40 and the middle frame 60 stacked thereon are moved to the lower mold closing position. The hydraulic actuator 11 ascends, whereby the lower mold M1, the middle plate 40, the middle frame 60, and the upper mold M2 are combined to form the mold. The vacuum covers 80 descends to cover the combined mold, so that a first vulcanization hot pressing operation is carried out. Simultaneously, the fasten unit 70 drives the peripheral wall 731 of the sleeve member 73 to be restored for abutting the plurality of beads 71 in the recess portion 611 and engaged with the position pin 61. Whereby the middle frame 60 is reconnected with the push mechanism 50.

When the first vulcanization hot pressing is completed, the lower mold seat 20 descends along with the hydraulic actuator 11, such that the lower mold M1, together with the middle plate 40 and the middle frame 60, is separated with the upper mold M2 for opening the mold, wherein the lower mold M1 and the middle plate 40 form the external sole (not shown), and the middle plate 40, the middle frame 60, and the upper mold M2 form the external sole (not shown). Then, the middle plate 40 moves to the middle plate backward position, and the hydraulic actuator 11 ascends again, so that the lower mold M1, and the middle frame 60, and the upper mold M2 are combined under the cover of the vacuum cover 80, so as to carry out a second vulcanization hot pressing upon the external sole and the internal sole in the mold, thereby combining the external sole and the internal sole to form the rubber sole product. Next, the hydraulic actuator 11 descends for opening the lower mold M1 and the upper mold M2, then the upper mold seat 30 moves to the tilt position, and the middle frame 60 is pushed out by the push mechanism 50, allowing the user to take out the rubber sole.

With the foregoing configuration, effects of the present invention will be illustrated below.

Before the lower mold M1, the middle plate 40, and the middle frame 60 are combined with the upper mold M2 for thermo-molding operation, the lower mold seat 20 moves to the lower mold forward-moving position, the user is allowed to cleanse the lower mold M1 and feed material therein. When the middle plate 40 is at the middle plate closing position, with the fasten unit 70 and the position pin 61 leaving for the middle frame 60 to be stacked on the middle plate 40, the user is able to cleanse the cavity formed by the middle frame 60 and the middle plate 40 and feed material therein while the lower mold seat 20 moving to the lower mold forward-moving position. At the same time, the lower mold seat 20 already leaves the down side of the upper mold seat 30, and the middle frame 60 moves away from the push mechanism 50 as well. Therefore, when carrying out the cleansing and material feeding operations, the user is not hindered by the push mechanism 50 and even the upper mold seat 30 and the upper mold M2, and further prevented from injury such as high temperature burning or accidental hand clamping. Thus, the cleansing and material feeding operations of the lower mold M1, the middle plate 40, and the middle frame 60 are safer and more efficient, thereby improving the manufacturing efficiency.

Accordingly, when the fasten unit 70 is separated from the position pin 61 for the middle frame 60 to leave the push mechanism 50 to be stacked on the middle plate 40, the upper mold M2 is free from hindering of the middle frame 60, so that the user can move the upper mold seat 30 to the normal position, so as to easily cleanse the upper mold M2. Therefore, the present invention facilitates the safe and efficient cleansing operation of the upper mold M2, thereby improving the manufacturing efficiency.

The machine seat 10 of the present invention further comprises a block body 13 on two side plates 12, respectively. The first block portion (such as the flange 131 above) of the block body 13 and the second block portion (such as the groove 32 above) are combined. When the lower mold seat 20 ascends to be combined with the lower mold seat 30 under a pressurized lifting status, the two side plates 12 are restrained by each block body 13, so that the distance between the two side plates 12 is maintained. Therefore, the two side plate 12 will not expand to deform by the pressurized lifting force imposed by the ascending lower mold seat 20, thereby maintaining the structural stableness of the machine seat 10.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A rubber sole thermo-molding machine, comprising:
a machine seat comprising a hydraulic actuator;
a lower mold seat disposed on the hydraulic actuator, a lower mold disposed on the lower mold seat, the lower mold seat connected with a first horizontal movement mechanism, the first horizontal movement mechanism controlling the lower mold seat to horizontally move between a lower mold closing position located on a relatively backward side and a lower mold forward-moving position located on a relatively forward side;
an upper mold seat disposed on the machine seat and arranged above the lower mold seat, a upper mold disposed on the upper mold seat, the upper mold seat connected with a turning mechanism disposed on the machine seat; the turning mechanism driving the upper mold seat to move between a normal position and a tilt position; when the upper mold seat is at the normal position, the lower mold seat, according to an operation of the hydraulic actuator, ascends or descends the lower mold to achieve a mold closing status or a mold opening status with the upper mold;
a middle plate disposed between the lower mold seat and the upper mold seat and connected with a second horizontal movement mechanism, the middle plate horizontally moving between a middle plate backward-moving position, a middle plate closing position, and a middle plate forward-moving position; when the middle plate is at the middle plate closing position, with the upper mold seat being at the normal position and the lower mold seat being at the lower mold closing position, the middle plate is arranged in direct alignment between the upper mold seat and the lower mold seat;
a middle frame comprising a position pin;
a push mechanism disposed on the upper mold seat and having a fasten unit, the fasten unit comprising a plurality of beads, the fasten unit controlling the beads to be engaged with the position pin, such that the middle frame moves toward or away from the upper mold seat according to an operation of the push mechanism; the fasten unit also controls the beads to leave the position pin, so that the fasten unit is separated from the middle frame according to the operation of the push mechanism; and when the beads leave the position pin, with the first horizontal movement mechanism driving the lower mold seat to move to the lower mold forward-moving position, the middle frame is stacked on the middle plate, so as to move to the middle plate forward-moving position along with the lower mold seat;

the position pin comprising a recess portion; the fasten unit comprising a seat body and a sleeve member; the seat body comprising a pin bore and the plurality of beads, and the beads being able to transversely move with respect to the pin bore; the sleeve member comprising a peripheral wall connected with a peripheral side of the seat body; the seat body being engaged with the corresponding position pin with the pin bore and drives the sleeve member to abut against the beads in the recess portion with the peripheral wall to be engaged with the position pin; the fasten unit driving the peripheral wall of the sleeve member to retreat from abutting against the beads in the recess portion to leave the position pin;

wherein the push mechanism comprises a plurality of tube members; the tube members are able to longitudinally movably pass through the upper mold seat; each tube member comprises the fasten unit, and the fasten unit further comprises a control member and a movement rod; the control member is disposed on a top end of the tube member, and the movement rod movably passes through the corresponding tube member and is connected with the control member; the seat body is disposed on a bottom end of the corresponding tube member, and the sleeve member is connected with a bottom end of the corresponding movement rod; the movement rod is controlled to move in the corresponding tube member; the seat body longitudinally moves with the corresponding tube member to be engaged with the corresponding position pin through the pin bore, and axially moves with the movement rod to drive the sleeve member to abut against the beads in the recess portion with the peripheral wall, or axially moves with the movement rod to retreat the peripheral wall of the sleeve member from abutting against the beads in the recess portion.

2. The thermo-molding machine of claim 1, wherein the push mechanism comprises a push cylinder, the push cylinder has a drive shaft stretchable on one end of the push cylinder; one end of the drive shaft stretching out from the push cylinder is combined with the upper mold seat; the push cylinder has a combination plate disposed on the end of the push cylinder on which the drive shaft stretches, and the plurality of tube members are disposed on the combination plate, so as to move with respect to the upper mold seat along with a stretching and retracting motion of the drive shaft.

3. The thermo-molding machine of claim 1, further comprising two side plates disposed on two opposite sides of the machine seat, respectively; the upper mold seat is disposed between the two side plates and arranged on an upper side.

4. The thermo-molding machine of claim 3, wherein each of the two side plates has a block body, and the two block bodies are disposed on two opposite sides of the side plates; each block body comprises a first block portion on one side, and a second block portion is disposed on one side of the upper mold seat corresponding to the first block portions; when the upper mold seat is at the normal position, the first block portions and the second portion are engaged, so that when the lower mold seat ascends to be combined with the upper mold seat in a pressurized lifting status, the two side plates are restrained by each block body, so as to maintain a distance therebetween and be prevented from expanding.

5. The thermo-molding machine of claim 4, wherein the first block portion is a flange disposed on a bottom portion of the block body, and the second block portion is a groove disposed on the upper mold seat corresponding to the flange, so that the flanges restrain the two side plates in the groove.

6. The thermo-molding machine of claim 3, wherein the upper mold seat is pivotally disposed on a top portion of the two side plates and able to be reversely turned; the turning mechanism comprises a lift cylinder and a shaft coupling member; the lift cylinder has an operation shaft stretchable on one end; the shaft coupling member is disposed on one side of the upper mold seat and pivotally connected with the end of the operation shaft stretching out of the lift cylinder, so that the operation shaft stretches and retracts to drive the upper mold seat to move between the normal position and the tilt position.

7. The thermo-molding machine of claim 1, further comprising a vacuum cover movably disposed on the upper mold seat, and driven by a vacuum cover control mechanism to ascend and descend between a closing position located on a relatively lower side and an opening position located on a relative upper side.

8. The thermo-molding machine of claim 7, wherein the vacuum cover control mechanism comprises an elevation cylinder, and the elevation cylinder has a valve rod connected with the upper mold seat, with a linkage plate fixed on the elevation cylinder, and two ends of the linkage plate being connected with the vacuum cover through a connection rod, respectively.

* * * * *